United States Patent [19]

Diskin et al.

[11] Patent Number: 4,849,862
[45] Date of Patent: Jul. 18, 1989

[54] SUSPENDED AIR PURIFIER LIGHT FIXTURE

[75] Inventors: Steve Diskin, Los Angeles; Lawrence Lerner, Beverly Hills, both of Calif.

[73] Assignee: Mega/Erg Inc., Beverly Hills, Calif.

[21] Appl. No.: 157,909

[22] Filed: Feb. 19, 1988

[51] Int. Cl.⁴ ............................................. F21V 33/00
[52] U.S. Cl. ...................................... 362/96; 362/218; 55/385.1; 55/385 A
[58] Field of Search ..................... 362/96, 149, 218; 55/385 A; 98/40.01, 40.13, 40.15

[56] References Cited

U.S. PATENT DOCUMENTS

| | | | |
|---|---|---|---|
| 2,359,021 | 9/1944 | Campbell et al. | 362/96 X |
| 3,320,406 | 5/1967 | Wainwright | 362/149 X |
| 4,526,592 | 7/1985 | Armbrustor | 55/385 A X |
| 4,560,395 | 12/1985 | Davis | 55/385 A X |
| 4,626,262 | 12/1986 | Forss | 55/385 A X |
| 4,666,478 | 5/1987 | Boissinot et al. | 55/316 X |
| 4,681,024 | 7/1987 | Ivey | 362/149 X |

Primary Examiner—Michael Koczo
Assistant Examiner—Peggy Neils
Attorney, Agent, or Firm—Charles H. Schwartz; Ellsworth R. Roston

[57] ABSTRACT suspended air purifier fixture including, a radially-symmetrical enclosure forming an internal cavity and including a peripheral surface having a plurality of circumferential openings and a lower surface with a central opening perpendicular and adjacent to the peripheral surface. A centrifugal fan is located within the enclosure and is coaxial with the central opening. An intake assembly is coaxial with the central opening and includes a vane for directing an intake flow of air through the assembly and into the enclosure through the central opening. An air filter is circumferentially disposed relative to the fan and occupies the space between the vane and the peripheral surface. An output grille covers the circumferential openings to have an exhaust air flow perpendicular to the intake thorugh the central opening. Suspension means are located at the surface of the enclosure opposite to the lower surface for supporting the fixture from an overhead position.

12 Claims, 3 Drawing Sheets

SUSPENDED AIR PURIFIER LIGHT FIXTURE

BACKGROUND OF THE INVENTION

1. Field of the Invention

A suspended air purifier light fixture of very low profile suitable for ceiling mounting in conference rooms or open plan offices and public areas. The fixture simultaneously provides effective removal of tobacco smoke and other indoor pollutants while serving as a conventional light fixture. The fixture is quiet in operation, has a low profile, provides for the efficient flow of air, has a simple visual appearance and does not require modification of the ceiling construction.

2. Description of the Prior Art

The growing evidence supporting the deleterious effect of tabacco smoke has brought the problem of indoor air pollution into sharp focus. People are now conscious of the fact that indoor sources of pollutants, such as secondary cigarette smoke and the outgassing of modern building materials, are potentially as harmful to health as the actual smoking of cigarettes. Many states and communities have enacted laws and ordinances governing smoking in public places and workplaces. However, such laws and ordinances are often difficult to enforce, do not cover all localities and conditions, and may not apply to less well-known, but still dangerous sources of pollution. Thus, there is a growing need and demand for methods of and mechanical devices for removing indoor air pollutants, specifically, offensive cigarette smoke which ideally should be captured as close to the source as possible before the smoke mixes with the surrounding air.

In order to capture the pollutants, special attention must be paid to the configuration of any mechanical device used for this purpose and additionally the influence of the exhaust air flow pattern from the mechanical device must be carefully controlled. These purposes are best accomplished by a substantial reduction of exhaust air velocity in accordance with dispersion means and the geometry of the device. Where smoke removal is concerned, a poorly located exhaust air grille and excessive exhaust flow velocity through that grille has two main undesirable characteristics. First, the exhaust air can actually blow the smoke away before it reaches the intake. Second, high exhaust velocity generates a Bernoulli effect, thereby generating a region of negative pressure outside of the device to them compete with the negative pressure at the intake of the device. Obviously smoke attracted to the exhaust region is then blown away by the exhaust. In addition, when an exhaust grille is located too near the intake grille, "short circuiting" can occur, where the device intakes much of its own exhaust rather than ambient air.

Air purification equipment may be integrated within the building air handling system. If not incorporated at construction time, which is often the case, retrofit can be costly in labor and materials. Existing stand-alone devices are bulky and not designed to be simply hung in a space and switched on. A significant installation effort may be required, if only to conceal the unit behind suspended ceilings. Typical applications for stand-alone suspended air purifiers are in indoor, confined public spaces such as restaurants and bars where people congregate and often smoke. Offices, and particularly, conference rooms, or conference areas, are also examples of workspaces where cigarette smoking in groups may be a problem. Enclosed office areas also concentrate other indoor pollutants such as formaldehyde, bacteria and dust, especially in new buildings without operable windows.

The above described problem areas also are typically illuminated by suspended lighting fixtures which usually provide a significant amount of ambient light. Air purifiers and light fixtures, therefore, may both be directly suspended overhead for optimum operation and would be competing for the same overhead installation space. This additional problem suggests the appropriateness of a combination light source and air purifier, especially for use in a small converence area within an enclosed room or in an open-plan office, or in any other small scale spaces such as bars or workrooms.

Available filtration technology falls generally into two categories. Thse are electrostatic precipitation and filtration media, both of which have relative advantages an disadvantages. The actual method of filtration is not a specific part of the present application invention, since either or both techniques may be used. However, where is is relevant, a particular technique will be mentioned in more detail in the present application.

SUMMARY OF THE INVENTION

The present invention relates to a suspended air purifier lighting fixture enlosed in a single device. The invention is capable of functioning both as a cigarette smoke removal device as well as a constantly-running general air purifier while simultaneously furnishing a useful, disirable overhead light source. The light source is suitable for illuminating the area around a conference table, a grouping of workstations, or a small gathering space and the like. The fixture by its internal design, is of a substantially lower profile than existng devices, and may be substantially flush mounted to a standard eight-foot ceiling surface without special provision for ducting of air or extensive modification of ceiling or above ceiling components. The fixture is designed as a fully function light fixture and does not have to be concealed behind a dropped ceiling.

To accomplish the above purposes, the invention makes use of a large diameter centrifugal fan blade assembly with a central intake and a radial arrangement of filtration means around the perimeter of the fan blade assembly and with the entire structure located within an annular cavity. Air is exhausted in a direction perpendicular to the intake axis, which is thereby substantially parallel to the ceiling surface when the device is mounted for use. The exhaust is directed radially outward throughout the perimeter of the device, whose perimeter surface area is of a much larger magnitude than that of the intake surface area. This relationship of surface areas results in a dramatic and desirable slowing of the exhaust air velocity without need for baffles or additional impedances. Most existing purifiers use an exclusively "in-line" approach where an axial fan forces air linearly through a series of filters to an exhaust of substantially similar dimensions to that of the intake.

The primary object of the invention, then is to provide an improved ceiling-suspended, stand-alone air purifier with an integral useful light source.

Another object of the invention is specifically to remove cigarette smoke efficiently from above a table or work area or the like where cigarette smokers are likely to congregate.

A further object of the invention is to provide a device having a physical dimension smaller in depth than existing units so that a flush ceiling mount is possible without excessive intrusion into the space in which the device is used. This is particularly important when the height of the ceiling in the space is the usual standard eight feet.

Another object of the device is a radial air flow in which all air passing through the device is exhausted around the perimeter of the device in a plane parallel to the ceiling surface. This is accomplished through the use of a low-profile centrifugal fan. In addition, this arrangement permits a much larger exhaust port area compared to intake area, resulting in a beneficially reduced exhaust air velocity.

An additional object of the invention is a device which is quiet enough for constant operation when in close proximity to people working quietly. This accomplished through the use of specially configured fan blades and an overall unique torroidal geometry of the device, wherein the large perimeter exhaust is at low velocity and thereby less prone to noise.

Another object of the device is to provide a diffused, direct ambient light source. This is accomplished by an integrated air intake/light diffuser of a specific design to promote proper airflow and take advantage of available high efficiency fluorescent light bulbs.

DETAILED DESCRIPTION OF THE DRAWINGS

Figure 1:
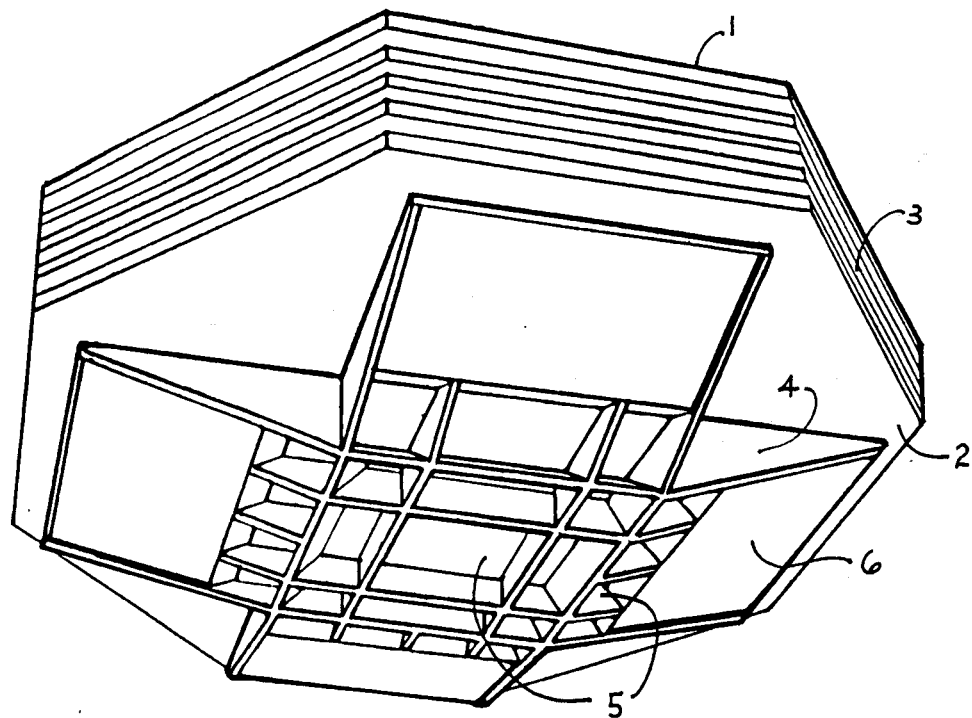
FIG. 1 is a perspective view of a suspended air purifier light fixture, seen from below as suspended from a ceiling surface.

Referring to the drawings, FIG. 1 shows a general perspective view of the suspended air purifier light fixture of the present invention. FIG. 1 simulates an observer looking upwards at an angle toward the invention installed in its intended operating position, either flush with the ceiling surface or otherwise suspended from an overhead surface. Typically the device is hung to be approximately seven feet above the floor for optimum operation. As will be disclosed in detail in the following text, not only is the invention designed for removal of general pollutants from indoor air, it is also specifically configured for effective abatement of cigarette smoke, and thus may be located above a conference table or other space around which people gather. In addition to the above, the present invention combines lighting in the device to provide for the simultaneous illumination and air purification from a nearby overhead source.

FIG. 1, then, illustrates the resultant combined device of the present invention. The main body structure of the invention consists of two assemblies. These are a purification section contained entirely within an enclosure comprising an upper plate member (1), and a lower plate member (2), both separated by a circumferential gap closed by a grille (3), and a diffuser assembly (4) comprising a series of louvered intake openings (5) combined with integral lighting diffuser panels (6).

Figure 2:
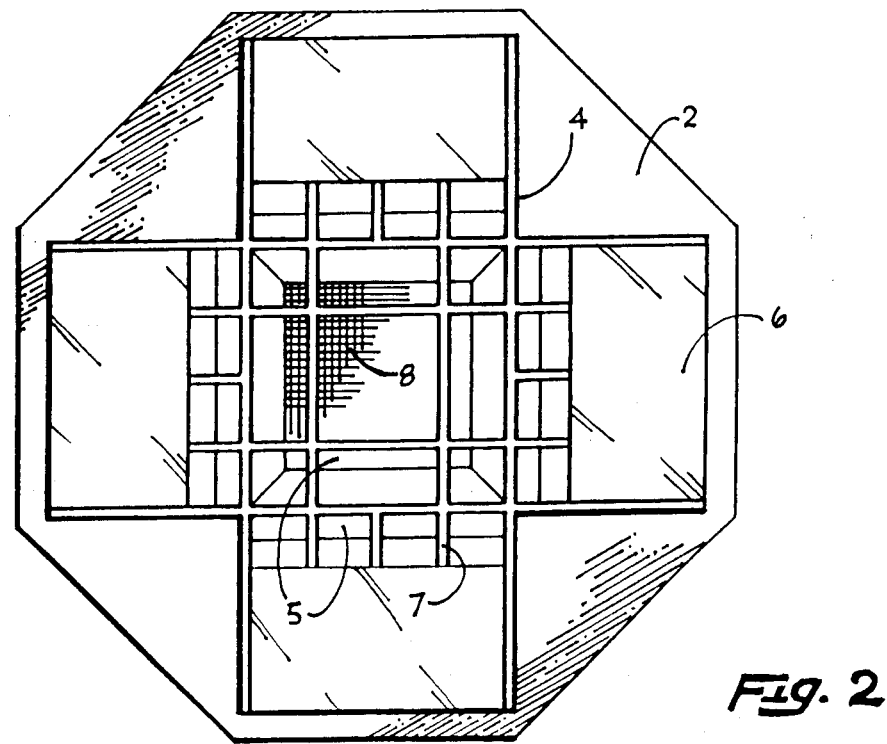
FIG. 2 is a plan view of the invention looking directly upward at the bottom of the device, showing the central air intake grille with its integrated lighting components.

FIG. 2 is a plan-type view of the underside of the device of the present invention, as viewed from below the device were looking directly upward. Note that in the specific embodiment of the invention as disclosed the overall shape of the device, as defined by the shape of the upper and lower plate members, is octagonal, although it is apparent that circular or other prismatic shapes may be used. The octagon shape is used since flat sides are less costly then curved exterior components. The octagon shape, however, does provide for the basic radial operation of the purifier portion of the invention, wherein the intake for polluted air is provided centrally through the various louvered openings (5) in the diffuser (4) and the exhaust for the purified air is through the grilles (3) along the periphery to provide for a centrifugal air flow pattern.

It has been determined that effective removal of cigarette smoke from the air is greatly enhanced by two factors. First, location of an air intake as close as possible to the offending smoke source in order to receive the smoke before it has a chance to diffuse into the ambient air. Second, a broad horizontal surface to impede the natural tendency of hot smoke to rise out of intake range. The horizontal surface constitutes a form of hood, to thus trap a certain amount of the smoke laden air so that it may be taken into the intake of the device. This trapped smoke would otherwise have escaped to the surrounding air.

It can be seen that cigarette smoke emanates from a small point, rises with convective current and remains coherent for a brief period, until it is completely dispersed into ambient air invisibly along with other pollutants. The present invention, therefore, addresses this problem with a broad flat lower plate member (2) and its variously oriented intake openings (5) which not only intake at the center of the device, but also at numerous peripheral locations surrounding the center and at the extremities of the lighting diffuser panels (6) as well. Ribs (7), built into the diffuser section (4) of the device, are sloped and canted outwards in order to define a broad horizontal zone of air suction beneath the device. Cigarette smoke may also contain a certain small quantity of large airborne ash particles, which can potentially clog the device, and these large particles are excluded from entry by a screen filter (8) located immediately behind the diffuser openings (5).

Figure 3:
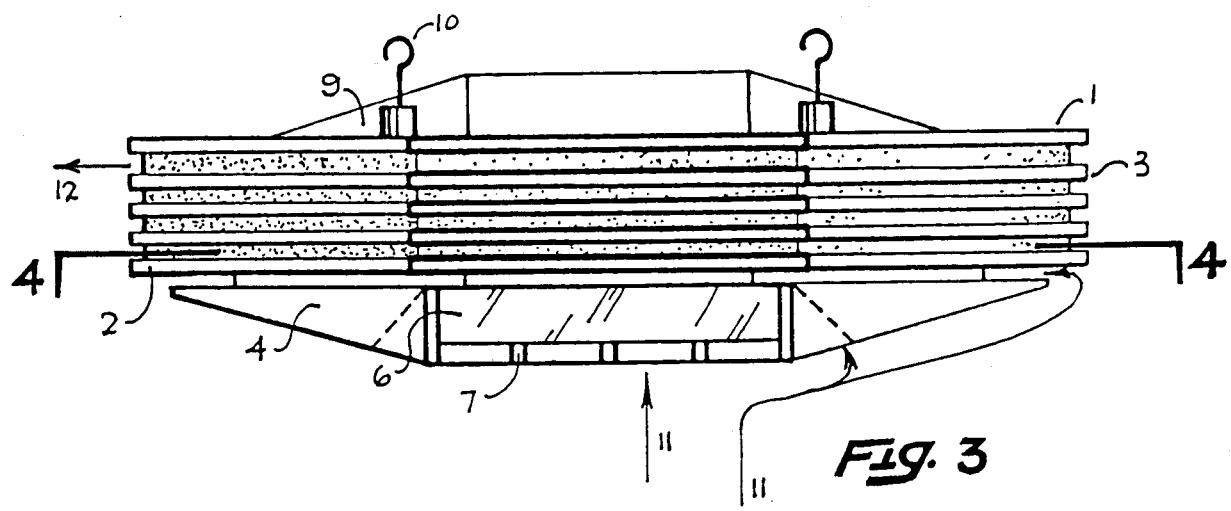
FIG. 3 is a side elevational view of the invention.

FIG. 3 illustrates in an elevational view the two assembly portions of the present invention. First, the air purification section bounded by the upper plate member (1) and lower plate member (2) and bounded at the exterior by a circumferential exhaust grille (3), thus creating an internal cavity. Second, the diffuser section (4) which integrates wedged-shaped lighting diffusers (6) and ribs (7) for directing the flow of intake air. Also visible in FIG. 3 is an upper shroud unit (9) for the dual purpose of enclosing a fan motor and for directing a secondary flow of air into the purifier. This secondary air flow over the fan motor keeps the motor from overheating. The present invention may be suspended for use in the ceiling-mounted position previously described, by suspension means (10, which are shown to be hooked extensions of internal structureal supports for the unit.

Figure 4:
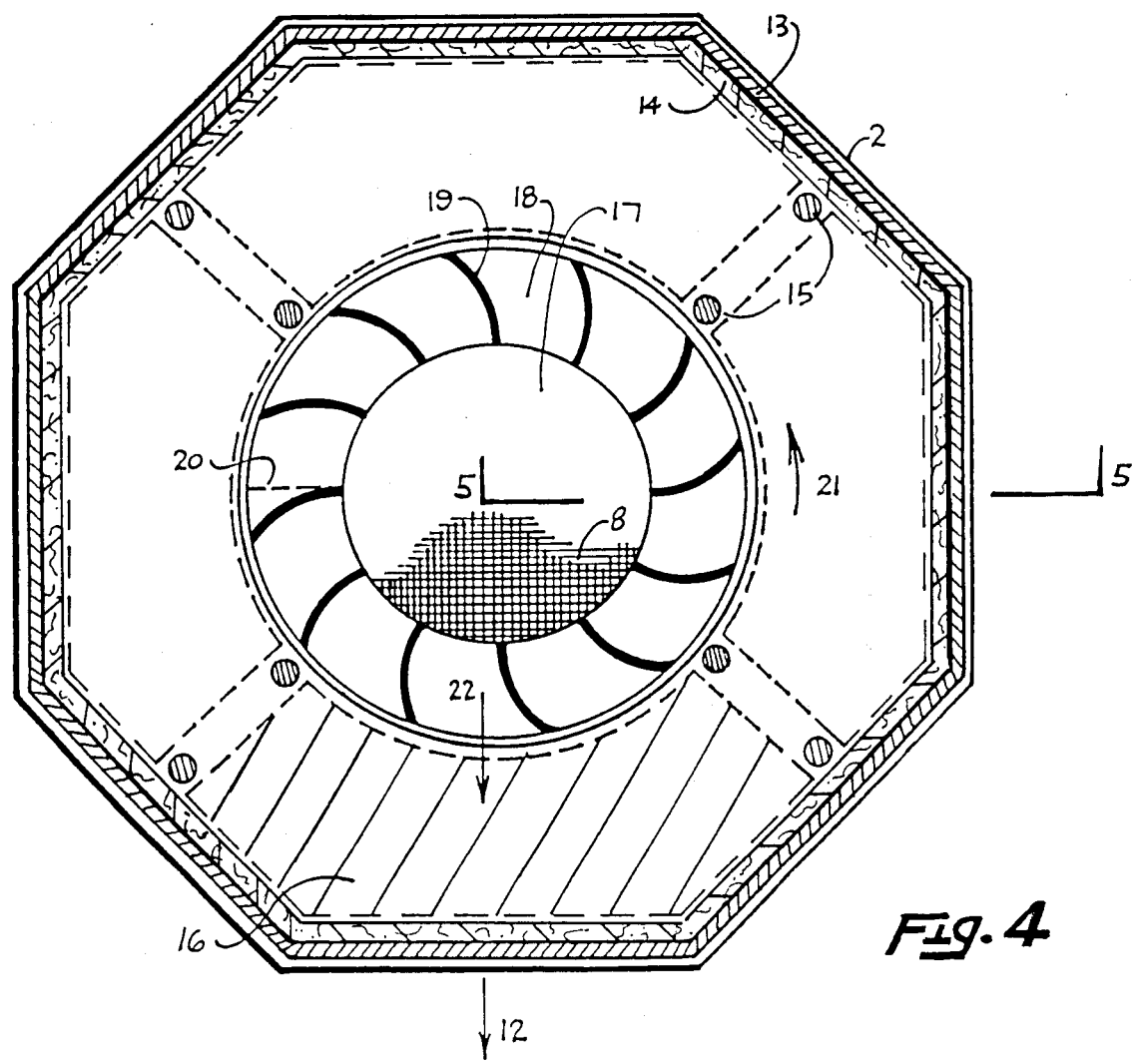
FIG. 4 is a cross sectional view through the mid-line of the invention taken along lines 4—4 of FIG. 3, showing the configuration of centrifugal fan blades and filtration means.

FIG. 4, a horizontal section through the interior of the present invention, reveals the relationship of an intake, fan, filtration means and exhaust. In FIG. 4, internal components are shown against the background of the upper surface of the lower plate member (2). Structural post members (15) are shown to be located at eight spaced posts. The post members (15) extend between the upper and lower plate members to define the interior cavity of the device. It is to be appreciated that other structural means may be used to provide for the desired interior cavity without altering the function or utility of the device. As described above, the suspension means (10) may be colinear with the internal structural means to properly support the device for suspention.

Figure 5:
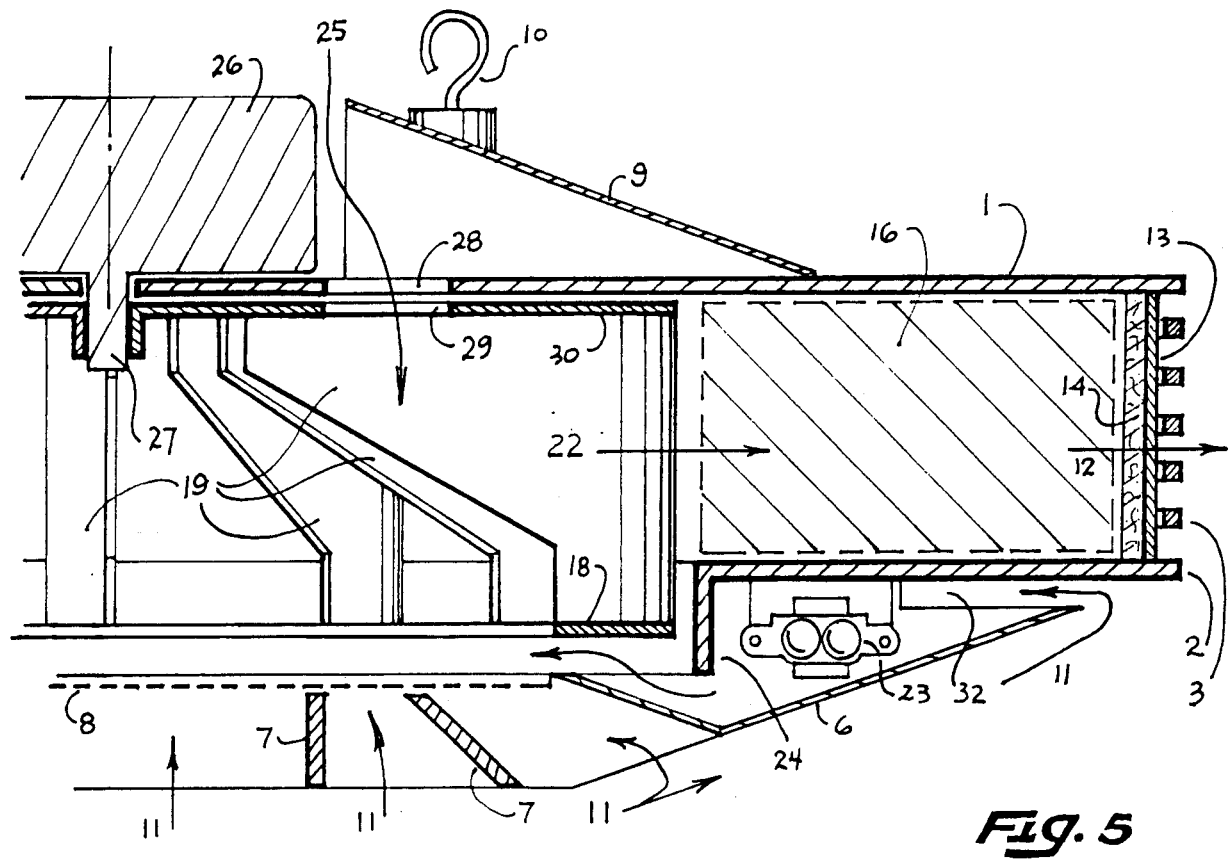
FIG. 5 is a cross sectional view through a portion of the air purifier taken radially through the device from its central axis to the perimeter taken along lines 5—5 of FIG. 4 and showing the arrangement of components producing the desired air flow and filtration.

Located at a central position in the air purification portion of the invention is a centrifugal fan blade assembly. The characteristics of centrifugal fans are generally well known. Specifically, the centrifugal fan takes in air through a central opening in the blade assembly and translates the resulting air flow through an angle of 90° and causes air to exit through the fan blades in a generally radial pattern. As shown in FIG. 5, the fan blade assembly includes an intake opening (17) in the center of the blade assembly. The filter screen (8) is visible through the opening (12).

The opening (17) is formed by an annular ring (18) which stabilizes and attaches to individual curved fan blades (19). This is clearly shown in FIG. 5. In the operation of the device or the present invention, the blades (19) are positioned with their leading edges slanted or curved forward of a radii (20) of the annular ring. "Forward" is this case means in the direction of rotation of the fan blade assembly or counter clockwise as shown in FIG. 4. This slanting or curving forward of the fan blades minimizes noise in the airflow. The noise deduction is desirable so that the invention can be operated constantly in or near work areas. In FIG. 4 an arrow (21) indicates the direction of rotation of the fan.

Air exiting the fan passes through the gaps in the fan blades (such as at 22) in a generally radial pattern and to pass through the filtration means (16). Two primary types of filtration means may be used in the present invention. These are electrostatic precipitation filtration and media filtration. Each type has its advantages and disadvantages, and for the purposes of the present invention either or both may be used to fit desired characteristics. In general the surface area of electrostatic plates or media filters are chosen to remove pollutants without excessive impedance to the air flow furnished by the fan. In addition, sufficient volume must be allocated in the filtration cavity for processing air.

The present embodiment, for example, can accommodate electrostatic plates, according to standard practice, in a ratio of approximately 1:20 of CFM capacity of the fan to surface area of the plates measured in square inches. In addition, the relative proportions of fan diameter to available area (measured by overall diameter) for filtration has been set at a ratio near 1:2 which has been determined to be sufficient for filtration means. Thus, for example, a device having a 14" diameter centrifugal fan, would have an overall enclosure measuring 28" in diameter assuming the height of the internal cavity is roughly equal to the height of the fan itself. This is true as seen in FIG. 5.

The air flowing (22) through filtration means (16) encounters a circumferential final filter layer (14) and then a circumferential charcoal impregnated filter layer (13), whereupon this air exits the device at the periphery as low velocity purified exhaust air (12). The filter layer (14) may not be necessary when the primary filtration means (16) comprises media filters. In general, the filter layer (14) is used as an adjunct to the eletrostatic precipitator.

In addition to the proportions described above, another important proportion is the ratio of intake area to exhaust area. This can be expressed as the ratio of the area of the internal opening (17) of the annular ring (18) of the fan blade assembly relative to the total surface area along the periphery of the charcoal filter layer (13). The present invention provides for a proportion of approximately 1:3. This large ratio results is a desirable reduction of exhaust air velocity to provide a decrease in noise from high velocity air and a reduction of the impact of exhaust air flow on nearby intake air flow. The reduced exhaust air velocity achieved by the geometry of te present device is therefore important.

The vertical cross section of FIG. 5 illustrates the operation of the device and shows the relationship of all of the parts. Assume the device is suspended above a source of cigarette smoke. Arrows (11) represent the smoke-laden air flow which moves naturally upwardly by convection and is then influenced by the intake section of the fan. Suction pulls air through the ribs (7) of the diffuser toward the central cavity of the centrifugal fan blade assembly, which cavity is defined by the fan blades (19) themselves. The blades (19) are secured by a base plate (30) and the annular ring (18). Smoke which does not enter the device through the central opening is directed toward the periphery by the wedge shape of the lighting diffusers (6). These diffusers are positioned so as to create a gap (32) with respect to the lower plate member (2). Smoke-laden air may also enter the device through this gap. Thus the entire bottom of the device is configured to attract and trap a broad pattern of air. An air path exists, then, over the top of the lighting diffusers, past high-efficiency fluorescent light bulbs (23) which are located within the space between the lower plate member (2) and the diffusers (6). These bulbs are used specifically to allow low temperature operation in very close proximity to the diffusers (6) and the maintenance of the wedge shape for the diffuser elements.

Air which has passed through the gap (32) flows into the main fan cavity of the device. A third air path (25) is shown above the fan blades (19). One purpose of this path (25) is to provide cooling for a fan motor (26). A fan shaft (27) extend from the motor ((26) and is coupled to the centrifugal fan base plate (30). The upper shroud elements (9) help direct incoming air along the air path (25) to be very close to the fan motor (26). Holes (28) in the upper plate member (1) align with holes (29) in the fan base plate (30) to complete the air path (25) so that air can enter the cavity formed by the fan blades (19). The centrifugal fan arrangement of the present invention, therefore, allows for the ability to intake air from two opposing directions simultaneously. The upper air path (25) is also advantageous in that convection tends to drive airborne pollutants to a stratum adjacent to the ceiling surface and air from this stratum may thus enter the device easily for purification. The suspension means (10) can assure that a small gap is maintained even when the device is mounted very near the ceiling surface.

The centrifugal fan arrangement of the present invention initially induces a strong airflow normal to the axis of fan rotation. This airflow is shown at (22), and the air is initially processed by the filtration means (16). Exhaust air (12) is further filtered by the final filter (14) (if necessary), a charcoal filter (13) for odor removal and then exits through the circumferential grille (3). Since the surface area of the exhaust grille relative to the intake area is quite large, the resultant velocity of the exhaust air (12) is markedly reduced.

Figure 6:
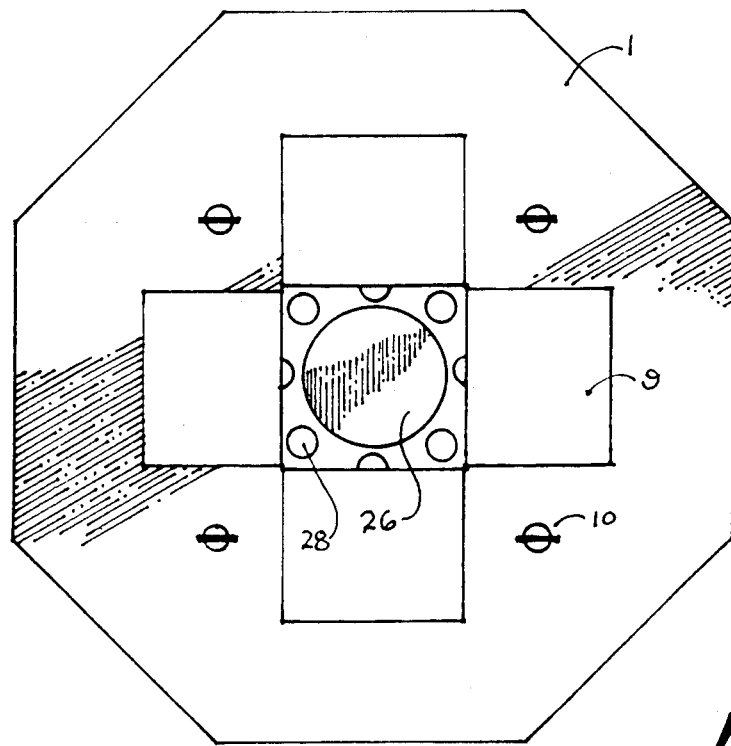
FIG. 6 is a plan view of the top of the invention.

FIG. 6 illustrating a top view of the device. The fan motor (26) is shown in the center, surrounded by the ventilation intake holes (28). The shroud elements (9) help direct air toward the ventilation intake hole area and cosmetically shield the motor from view. The suspension points (10) are also indicated.

Although the invention has been described with reference to a particular embodiment, it is to be appreciated that various adaptations and modifications may be made and the invention is only to be limited by the appended claims.

We claim:

1. A suspended air purifier fixture which comprises:
   a symmetrical enclosure extending radially outward from a central axis and forming an internal cavity, disposed around the central axis and including a peripheral surface having a plurality of circumferential openings and further including a lower surface of the enclosure perpendicular and adjacent said peripheral surface and said lower surface having a central opening disposed around the central axis,
   centrifugal fan means located within said enclosure and coaxial with said central opening,
   an intake assembly coaxial with the central opening and comprising vane means for directing an intake flow of air through said assembly and into said enclosure through the central opening,
   air filtration means circumferentially disposed relative to said fan means and occupying the space between the vane and the peripheral surface,
   an output grille covering the circumferential openings in said peripheral surface to have an exhaust air flow perpendicular to the intake through the central opening, and
   suspension means located at the surface of the enclosure opposite to said lower surface for supporting the fixture from an overhead position.

2. The suspended air purifier fixture as recited in claim 1 wherein said enclosure means includes an upper plate and lower plate separated by spacers to form the internal cavity.

3. The suspended air purifier fixture as recited in claim 1 wherein said filter means includes an electrostatic precipitator.

4. The suspended air purifier fixture as recited in claim 1 where said filter means includes media filters.

5. The suspended air purifier fixture as recited in claim 1 including additional filter means and with the additional filter means activated charcoal.

6. The suspended air purifier fixture as recited in claim 1 additionally including illumination means mounted below said lower surface.

7. The suspended air purifier fixture as recited in claim 6 wherein said illumination means includes translucent diffuser panels mounted below said lower surface to form a space between said diffuser panels and lower surface for mounting light emitting devices.

8. The suspended air purifier fixture as recited in claim 7 wherein the space between said diffuser panel and lower surface communicates with the central opening to have air trapped at the periphery of the fixture drawn into the central opening for filtering.

9. The suspended air purifier fixture recited in claim 1 wherein the symmetrical enclosure is octagon in shape.

10. The suspended air purifier fixture recited in claim 1 wherein the centrifugal fan means has a toroidal shape formed by a plurality of vane members and with the vane members extending forwardly relative to the direction of rotation of the fan to reduce noise.

11. The suspended air purifier fixture as recited in claim 1 additionally including shroud elements located on an upper surface to direct air to the cavity from an upper position.

12. The suspended air purifier fixture as recited in claim 11 wherein the fan means includes a fan motor and the air directed to the cavity by the shroud elements provides cooling of the motor.

* * * * *